(12) United States Patent
Gholmieh et al.

(10) Patent No.: US 10,609,613 B2
(45) Date of Patent: Mar. 31, 2020

(54) UE NETWORK MOBILITY DURING IMS

(71) Applicant: QUALCOMM Incorporated, San Diego, CA (US)

(72) Inventors: Aziz Gholmieh, Del Mar, CA (US); Srinivasan Balasubramanian, San Diego, CA (US); Ramachandran Subramanian, San Diego, CA (US); Manu Sharma, Mountain View, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 15/679,981

(22) Filed: Aug. 17, 2017

(65) Prior Publication Data

US 2018/0054767 A1 Feb. 22, 2018

Related U.S. Application Data

(60) Provisional application No. 62/377,408, filed on Aug. 19, 2016.

(51) Int. Cl.
*H04W 36/14* (2009.01)
*H04L 29/06* (2006.01)
(Continued)

(52) U.S. Cl.
CPC ......... *H04W 36/14* (2013.01); *H04L 65/1016* (2013.01); *H04L 65/1059* (2013.01);
(Continued)

(58) Field of Classification Search
CPC . H04W 36/14; H04W 36/0022; H04W 80/04; H04W 76/12; H04W 68/00;
(Continued)

(56) References Cited

U.S. PATENT DOCUMENTS 9,413,561 B2 8/2016 Keller et al.
9,509,853 B2 11/2016 Mufti et al.
(Continued)

FOREIGN PATENT DOCUMENTS

EP 1 959 622 A1 8/2008
WO WO-2007/079579 A1 7/2007

OTHER PUBLICATIONS

International Search Report and Written Opinion—PCT/US2017/047614—ISA/EPO—dated Nov. 27, 2017. 18 pages.

*Primary Examiner* — Dady Chery
(74) *Attorney, Agent, or Firm* — Arent Fox, LLP

(57) ABSTRACT

The disclosure provides for a user equipment (UE) to change from a first network to a second network for an internet protocol (IP) multimedia subsystem (IMS) call. Initially, the UE has a connection to a first network providing an IP address for the UE. The UE may receive, via the first network, a message indicating an incoming IMS call. The UE may transmit one or more IMS call setup messages on the first network at an IP layer. The UE may change the connection from the first network to a second network that uses a same identifier for the UE (e.g., the IP address). The UE may complete setup of the IMS call on the second network using the same identifier for the UE.

26 Claims, 9 Drawing Sheets

(51) Int. Cl.
*H04W 36/00* (2009.01)
*H04W 36/04* (2009.01)
*H04W 80/04* (2009.01)

(52) U.S. Cl.
CPC ..... *H04L 65/1069* (2013.01); *H04W 36/0022* (2013.01); *H04W 36/04* (2013.01); *H04W 80/04* (2013.01)

(58) Field of Classification Search
CPC ............ H04L 65/1059; H04L 65/1069; H04L 65/1016; H04L 65/608; H04L 65/4061; H04L 65/1073
See application file for complete search history.

(56) References Cited

U.S. PATENT DOCUMENTS

| | | | |
|---|---|---|---|
| 9,655,005 B2 | 5/2017 | Ahmavaara et al. | |
| 2007/0195802 A1* | 8/2007 | Kallio | H04L 65/1069 370/401 |
| 2009/0303971 A1* | 12/2009 | Kim | H04W 76/12 370/338 |
| 2011/0069679 A1* | 3/2011 | Onishi | H04W 36/0022 370/331 |
| 2013/0100887 A1 | 4/2013 | Kim | |
| 2014/0372546 A1* | 12/2014 | Belling | H04M 7/1205 709/206 |
| 2015/0092630 A1 | 4/2015 | Lin et al. | |
| 2017/0164234 A1 | 6/2017 | Kalapatapu et al. | |

\* cited by examiner

UE NETWORK MOBILITY DURING IMS

CLAIM OF PRIORITY UNDER 35 U.S.C. § 119

This application claims priority to U.S. Provisional Application No. 62/377,408, titled "UE NETWORK MOBILITY DURING IMS," filed Aug. 19, 2016, which is assigned to the assignee hereof, and incorporated herein by reference in its entirety.

BACKGROUND

The present disclosure relates generally to communication systems, and more particularly, to user equipment mobility during Internet Protocol (IP) multimedia subsystem (IMS) calls.

Wireless communications systems are widely deployed to provide various telecommunication services such as telephony, video, data, messaging, and broadcasts. Typical wireless communications systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Communication services may be provided by multiple competing network operators within a geographical area. In an aspect, as radio access technologies deployed by network operators have become more similar, there is some degree of redundancy in deployment of network hardware. One proposal to reduce hardware redundancy and more efficiently deploy hardware is the concept of a neutral hosted network (NHN). A NHN may be a shared network that allows one or more network operators to offload traffic from subscribers onto the NHN.

Network operators, however, also seek to obtain a competitive advantage over competitors by providing high quality connectivity, especially for various priority services such as voice and video calls. In some cases, a NHN may be able to provide such services, but may be unreliable for providing the quality desired by the network operator responsible for the subscribers. Accordingly, there is a desire for network operators to maintain control over priority calls while allowing subscribers to offload traffic to a NHN or other network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Network operators may seek to provide high quality connectivity for particular services such as voice and video calls. These services, however, may be set up using interne protocol (IP) services as IP multimedia subsystem (IMS) calls. When the UE is operating on a NHN network, or another network where the network operator does not have control over the signaling, these IMS calls may be set up on the NHN network as normal IP traffic. The user may experience lower quality service than expected and blame the network operator. The network operator may provide a higher quality connection if the UE changes to a preferred network (e.g., the network operator's public land mobile network) for particular IMS calls. In an aspect, however, if the UE changes networks while setting up the IMS call, the IMS services may be unable to follow the UE and the call setup may fail.

In an aspect, the present disclosure provides for setup of IMS calls where the UE changes between a first network and a second network for the IMS call. The first network and the second network coordinate identifiers for the UE such that the IMS services may continue to communicate with the UE on the different networks. Further, the UE detects the IMS call setup and controls the change from the first network to the second network. The change may be based on a particular stage of the IMS call setup to allow the change to occur quickly without interrupting the IMS call setup.

A UE may change from a first network to a second network for an IMS call. Initially, the UE has a connection to a first network providing an IP address for the UE. The UE may receive, via the first network, a message indicating an incoming IMS call. The UE may transmit one or more IMS call setup messages on the first network at an IP layer. The UE may change the connection from the first network to a second network that uses a same identifier for the UE (e.g., the IP address). The UE may complete setup of the IMS call on the second network using the same identifier for the UE.

In an aspect of the disclosure, provides a method of wireless communication for a UE having a connection to a first network providing an IP address for the UE. The method may include receiving, via the first network, a message indicating an incoming IMS call. The method may include transmitting one or more IMS call setup messages on the first network at an IP layer. The method may include changing, by the UE, the connection from the first network to a second network that uses a same identifier for the UE. The method may include completing setup of the IMS call on the second network using the same identifier for the UE.

In another aspect the disclosure provides a UE for wireless communication. The user equipment may include a memory and at least one processor coupled to the memory. The at least one processor may be configured to receive, via a first network, a message indicating an incoming IMS call The UE may have a connection to the first network providing an IP address for the UE. The at least one processor may be configured to transmit one or more IMS call setup messages on the first network at an IP layer. The at least one processor may be configured to change, by the UE, the connection from the first network to a second network that uses a same identifier for the UE. The at least one processor may be configured to complete setup of the IMS call on the second network using the same identifier for the UE.

In another aspect the disclosure provides another UE for wireless communication. The UE may include means for receiving, via a first network, a message indicating an incoming IMS call. The UE may have a connection to the first network providing an IP address for the UE. The UE may include means for transmitting one or more IMS call setup messages on the first network at an IP layer. The UE may include means for changing, by the UE, the connection from the first network to a second network that uses a same identifier for the UE. The UE may include means for completing setup of the IMS call on the second network using the same identifier for the UE.

In another aspect, the disclosure provides a computer-readable medium storing computer executable code for a UE having a connection to a first network providing an IP address for the UE. The computer-readable medium may include code to receive, via the first network, a message indicating an incoming IMS call. The computer-readable medium may include code to transmit one or more IMS call setup messages on the first network at an IP layer. The computer-readable medium may include code to change, by the UE, the connection from the first network to a second network that uses a same identifier for the UE. The computer-readable medium may include code to complete setup of the IMS call on the second network using the same identifier for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
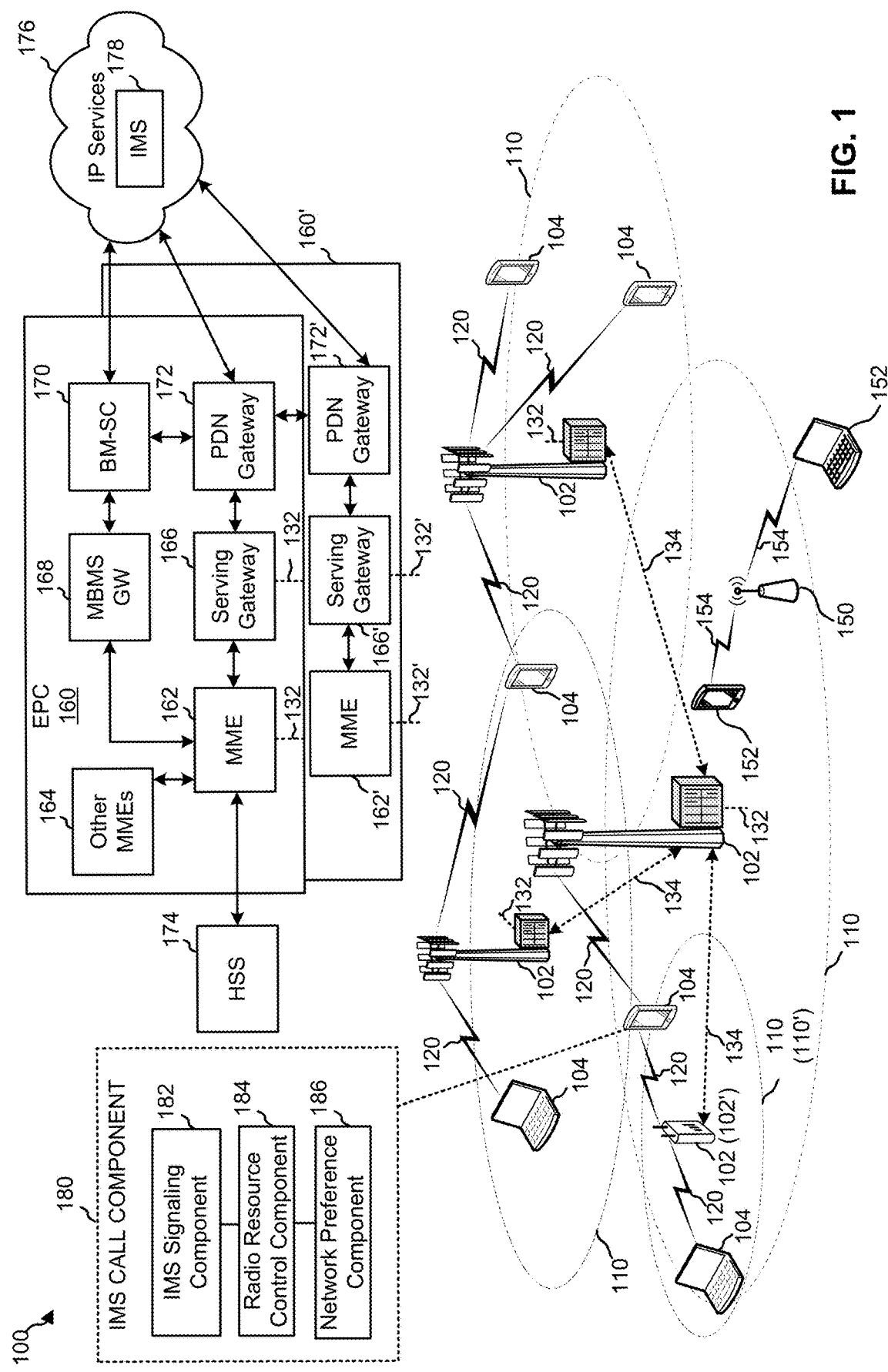
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The descriptions herein use LTE terminology. It should be appreciated that aspects disclosed herein may be applicable to other multi-access technologies and the telecommunication standards that employ these technologies. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. The disclosed techniques for UE network mobility during IMS may be used to change a UE between an LTE network and a 5G network for an IMS call based on the preferences and the type of IMS call.

FIG. 1 is a diagram illustrating an example of a wireless communications system including an access network 100. The wireless communications system (also referred to as a wireless wide area network (WWAN)) includes base stations 102, UEs 104, and an Evolved Packet Core (EPC) 160. The access network may be provided by a network operator and may be a public land mobile network (PLMN). The access network 100 may also be considered a dedicated network of the network operator. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132/132' (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. In an aspect. The AP 150 may form a wireless local area network (WLAN). The AP 150 may also be connected via a backhaul to the EPC 160 of the operator of access network 100, or to an EPC 160' of another operator or a NHN.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire. In an aspect, the small cell 102' may be part of a NHN. For example, a third party operator may provide small cells (e.g., small cell 102') in various locations that may be shared by one or more other network operators. The small cell 102' may be connected via a backhaul to the EPC 160 of the operator of access network 100, or to an EPC 160' of another operator or a NHN.

The EPC 160 may include a Mobility Management Entity (MME) 162, other MMEs 164, a Serving Gateway (SGW) 166, a Multimedia Broadcast Multicast Service (MBMS) Gateway 168, a Broadcast Multicast Service Center (BM-SC) 170, and a Packet Data Network (PDN) Gateway (PGW) 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS) 178, a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, eNodeB, eNB, an access point, a base transceiver station, a radio base station, a radio transceiver, a transceiver function, a basic service set (BSS), an extended service set (ESS), or some other suitable terminology. One or more base stations 102 may be an eNB that provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an aspect, the small cell 102' and/or the Wi-Fi AP 150 may be provided by a NHN. The NHN may operate in parallel with the network 100 and cover overlapping geographical areas. The base stations of the NHN may also communicate with an EPC 160', which may include similar components to EPC 160. For example, the EPC 160' may include an MME 162', a serving gateway 166', and a PDN gateway 172'. In an aspect, the PDN gateway 172 and the PDN gateway 172' may be a shared gateway, co-located gateways, or be in communication with each other. In particular, the PDN gateways 172, 172' may assign IP addresses to the UEs 104. In an aspect, a UE 104 may register with the network 100 and the NHN using the same credentials. The PDN gateways 172, 172' may assign the UE 104 the same IP address regardless of which access network the UE 104 uses to register. Accordingly, the IP services 176 including IMS 178 may communicate with the UE 104 using the same IP address.

Referring again to FIG. 1, in certain aspects, the UE 104 may be configured to set up an IMS call using a preferred network that is different from the network which the UE 104 is currently in communication. In an aspect, a UE 104 may include an IMS call component 180 for setting up the IMS call on the preferred network. The IMS call component 180 may receive, via a first network (e.g., small cell 102' or AP 150), a paging message indicating an incoming IMS call. The IMS call component 180 may send at least one message (e.g., a connection request) to set up the IMS call on the first network. The IMS call component 180 may change the connection from the first network to a second network that uses the same IP address for the UE (e.g., network 100 via base station 102). The IMS call component 180 may then complete setting up the IMS call on the second network using the same IP address.

In an aspect, the IMS call component 180 may include an IMS signaling component 182 for performing IMS signaling for setting up the IMS call. The IMS call component 180 may also include a radio resource control (RRC) component 184 for controlling network connections and changing the connection from the first network to the second network. In an aspect, the IMS call component 180 may also include a network preference component 186 for determining which network is preferred for an IMS call.

Figure 2:
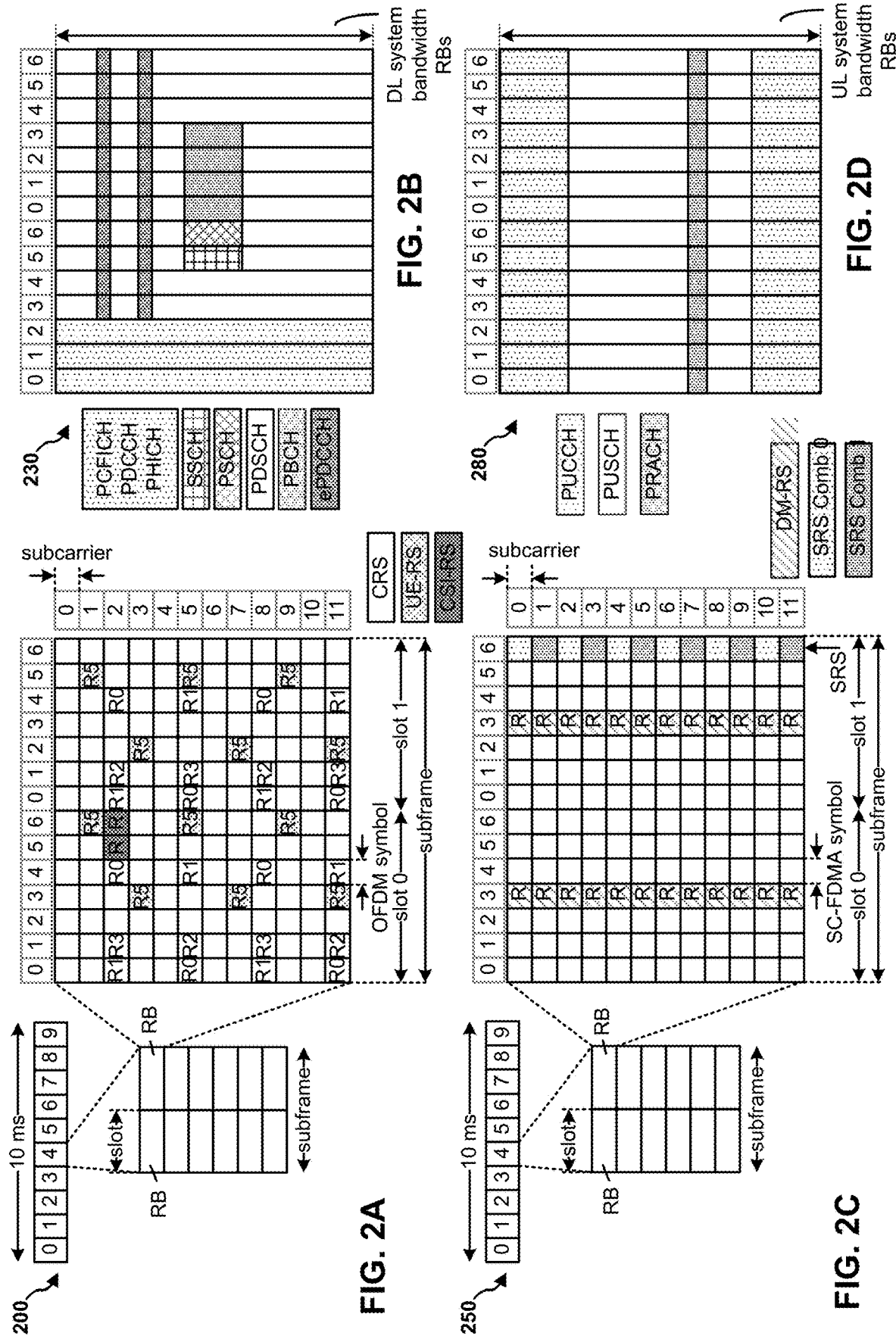
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. The illustrated frame structures may be used for transmissions at a physical (PHY) layer to carry RRC signaling and IMS signaling for UE network mobility during IMS. Other wireless communication technologies (e.g., 5G NR) may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
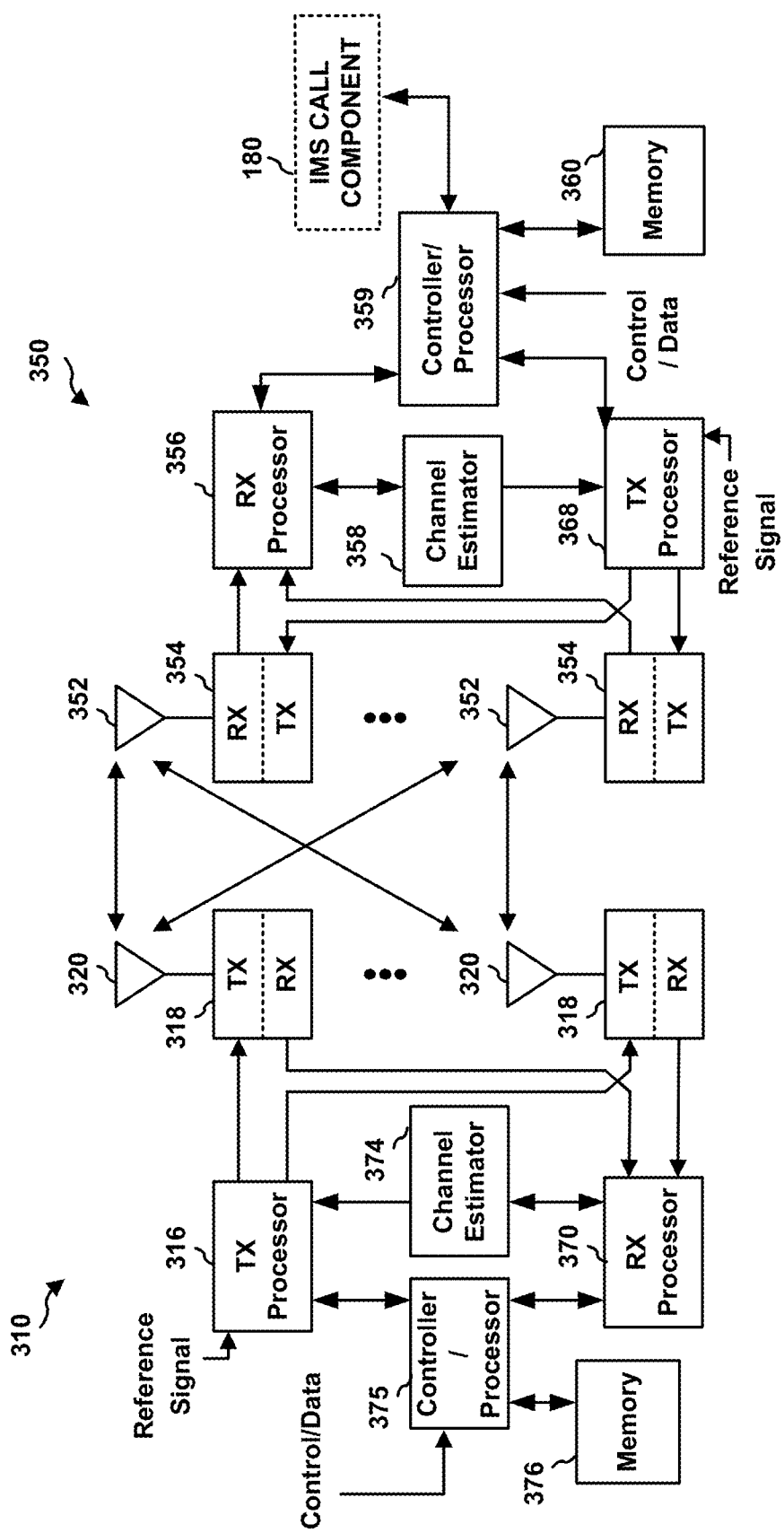
FIG. 3 is a diagram illustrating an example of an evolved Node B (eNB) and user equipment (UE) in an access network.

FIG. 3 is a block diagram of an eNB 310 in communication with a UE 350 in an access network. The UE 350 may correspond to the UE 104. The eNB 310 may correspond to the base station 102 or the small cell 102'. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. In an aspect, the IMS call component 180 may be implemented by the controller/processor 359 and may operate in part at the RRC layer. The IMS call component 180 may also operate at higher layers such as the IP layer carrying the IMS signaling.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
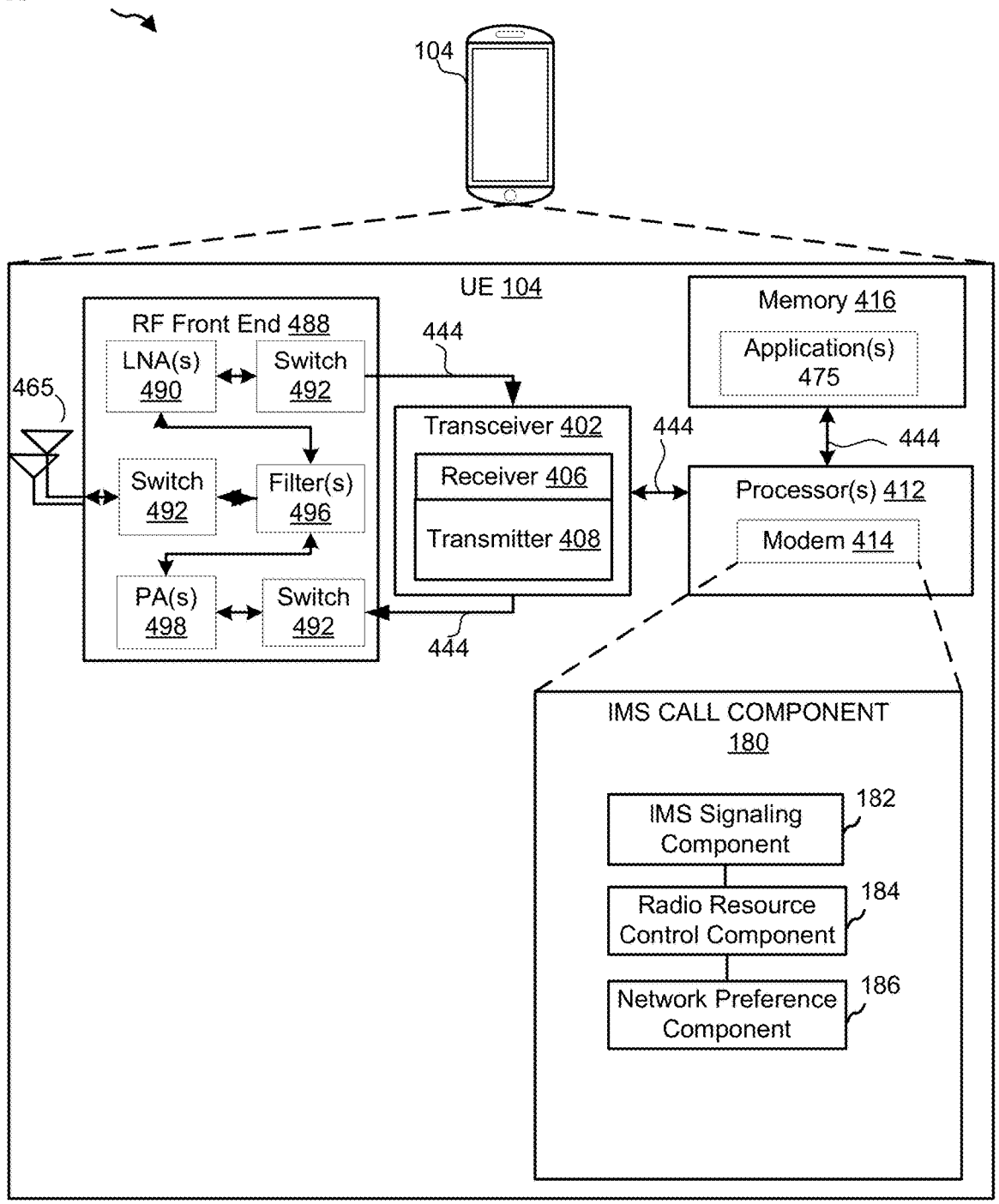
FIG. 4 is a schematic diagram of an aspect of an implementation of various components of the UE configured for communicating with the network entity, such as the base station, in accordance with various aspects of the present disclosure.

FIG. 4 schematically illustrates hardware components and subcomponents of the UE 104 for implementing one or more methods (e.g., method 800) described herein in accordance with various aspects of the present disclosure. For example, one example of an implementation of UE 104 may include a variety of components, some of which have already been described above, but including components such as one or more processors 412 and memory 416 and transceiver 402 in communication via one or more buses 444, which may operate in conjunction with the IMS call component 180 to enable one or more of the functions described herein related to including one or more methods of the present disclosure. Further, the one or more processors 412, modem 414, memory 416, transceiver 402, RF front end 488 and one or more antennas 465, may be configured to support voice and/or data calls (simultaneously or non-simultaneously) in one or more radio access technologies.

In an aspect, the one or more processors 412 can include a modem 414 that uses one or more modem processors. The various functions related to IMS call component 180 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with IMS call component 180 may be performed by transceiver 402.

Also, memory 416 may be configured to store data used herein and/or local versions of applications or IMS call component 180 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining IMS call component 180 and/or one or more of its subcomponents, and/or data associated therewith, when UE 104 is operating at least one processor 412 to execute IMS call component 180 and/or one or more of its subcomponents.

The IMS signaling component 182 may include hardware, firmware, and/or executable software stored in a computer-readable medium for sending and receiving signaling for an IMS call. In an aspect, the IMS signaling component 182 may send and receive SIP messages. Further, the IMS signaling component 182 may coordinate IMS signaling with lower layer operations of the UE 104. In particular, the IMS signaling component 182 may provide information regarding a current stage of an IMS setup procedure (e.g., which messages have been transmitted or received) to one or more other components of the UE 104 (e.g., the RRC component 184). Additionally, the IMS signaling component 182 may control the IMS signaling based on information from other UE components. For example, the IMS signaling component 182 may transmit or delay transmitting IMS signaling based on a status of an RRC layer connection as determined by the RRC component 184.

The RRC component 184 may include hardware, firmware, and/or executable software stored in a computer-readable medium for managing radio resources of the UE 104. For example, the RRC component 184 may determine to which wireless network the UE 104 is connected. The RRC component 184 may transmit RRC layer signaling (e.g., as defined in 3GPP standards) to establish, drop, or change a connection. The RRC component 184 may communicate with the IMS signaling component 182 to coordinate RRC layer changes with IMS setup procedures. For example, the RRC component 184 may initiate a network change based on a trigger from the IMS signaling component 182.

The network preference component 186 may include hardware, firmware, and/or executable software stored in a computer-readable medium for determining a preferred network for an IMS call. The network preference component 186 may determine a type of the IMS call based on an IMS call setup message (e.g., INVITE). The network preference component 186 may determine a preferred network for the IMS call based on the call type. The network preference component 186 may be configured with a prioritized list. For example, a dedicated network of a subscribed network operator may be a highest priority for voice calls and/or video calls. Other call types that may be associated with a priority include emergency calls, real time text (RTT) calls, or rich communication services (RCS) sessions. In contrast, a shared network or WLAN may be a higher priority network for streaming services. In an aspect, the subscriber's network may use over the air provisioning to set the priorities for the network preference component 186.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one base station 102. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, UE 104 may include RF front end 488, which may operate in communication with one or more antennas 465 and transceiver 402 for receiving and transmitting radio transmissions, for example, wireless communications transmitted by at least one base station 102 or wireless transmissions transmitted by UE 104. RF front end 588 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 590 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 502 and/or processor 412.

As such, transceiver 402 may be configured to transmit and receive wireless signals through one or more antennas 465 via RF front end 488. In an aspect, transceiver may be tuned to operate at specified frequencies such that UE 104 can communicate with, for example, one or more base stations 102 or one or more cells associated with one or more base stations 102. In an aspect, for example, modem 414 can configure transceiver 402 to operate at a specified frequency and power level based on the UE configuration of the UE 104 and the communication protocol used by modem 414.

In an aspect, modem 414 can be a multiband-multimode modem, which can process digital data and communicate with transceiver 402 such that the digital data is sent and received using transceiver 402. In an aspect, modem 414 can be multiband and be configured to support multiple frequency bands for a specific communications protocol. In an aspect, modem 414 can be multimode and be configured to support multiple operating networks and communications protocols. In an aspect, modem 414 can control one or more components of UE 104 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the UE 104 may be a single radio UE or may operate using a single radio. As used herein, a single radio may refer to any restriction on the radio components of the UE 104 that limits the UE 104 to active communication on a single radio network at a time. For example, the UE 104 may include a single antenna 465. The UE 104 may switch the antenna 465, the RF front end 488, and/or transceiver 402 for communication on either the first network or the second network. A tune away may occur when the UE switches from the current network to communicate with another network (e.g., to receive broadcast information or measure signal strength). In an aspect, the limitation may be due to a current configuration of the UE. For example, the UE 104 may be configured to operate using a single radio (even if other radios are available) to save battery power.

Figure 5:
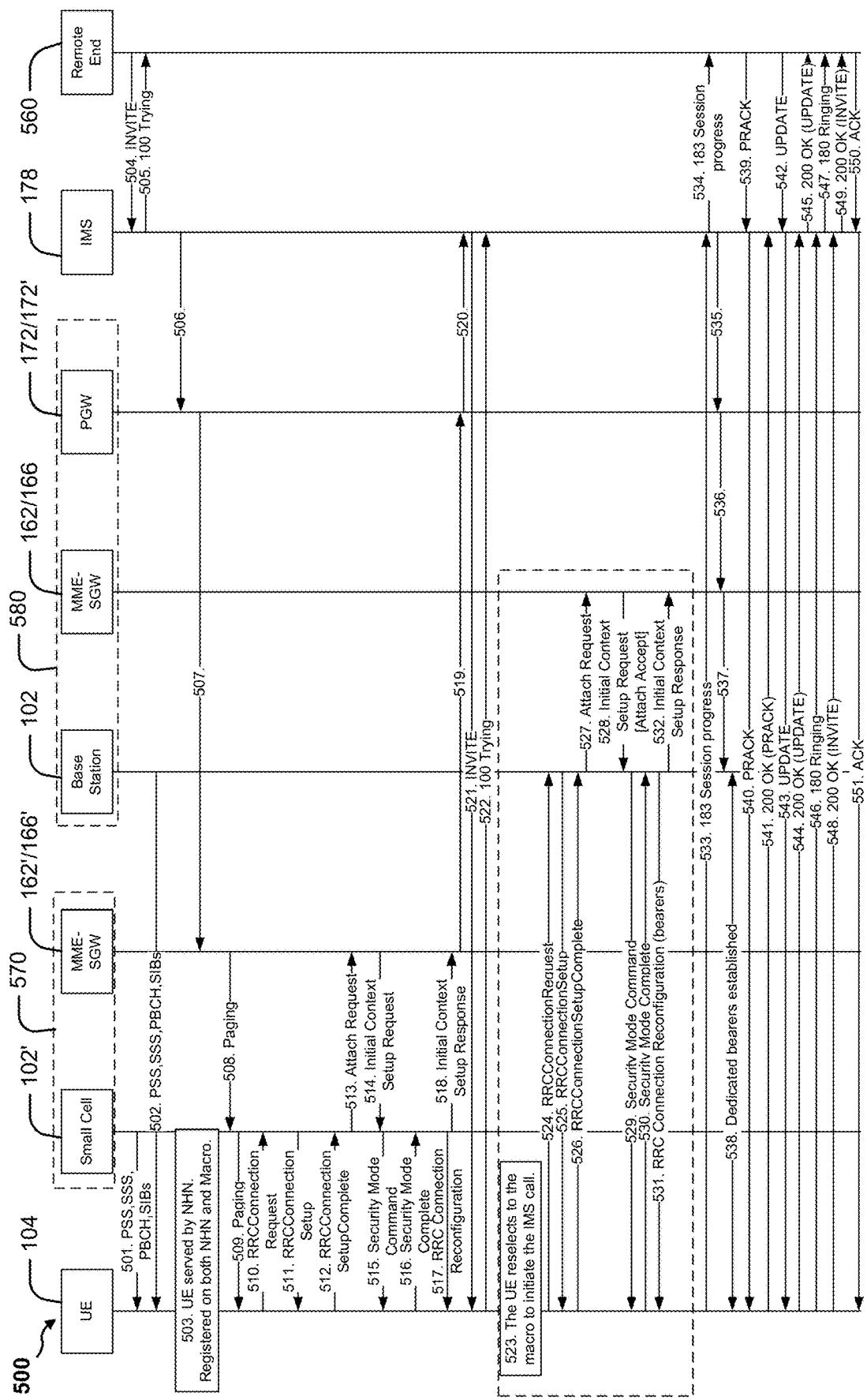
FIG. 5 is a message diagram illustrating an example call set where the UE changes from a first network to a second network.

FIG. 5 illustrates a message diagram showing an example call setup where the UE 104 changes from a first network 570 to a second network 580. The first network 570 may be an NHN including, for example, the small cell 102', the MME 162' and the SGW 166'. It should also be appreciated that the first network may be a WLAN or dedicated network such as an LTE or 5G NR network. Depending on the implementation of the first network, some signaling may be performed by either the MME 162' or SGW 166', so those entities are shown as a single node. The second network may be different network such as the network 100. In an aspect, the second network may not share any nodes with the first network. The second network may use a different radio access technology than the first network. For example, if the first network is a WLAN, the second network may be an LTE or 5G NR network. The second network may include the base station 102 (which may be an eNB), the MME 162, the SGW 166, and the PGW 172. The PGW 172 may communicate with the PGW 172'. In an aspect, the PGW 172 may be the same as the PGW 172'. In the illustrated example, a remote end 560, which may be another UE or any other device for making an IMS call, may initiate an IMS call to the UE 104. The IMS call may be considered a mobile terminated (MT) call from the perspective of the UE 104. Some of the messages for IMS call signaling may be session initiation protocol (SIP) messages. Other messages may be RRC layer messages. In this example, LTE RRC layer messages are illustrated, but it should be appreciated that other radio control messages may be used for establishing and changing connections between the UE 104 and the network.

At 501 and 502, the UE 104 may monitor broadcast information of the first network 570 and the second network 580, respectively. At 503, the UE 104 may be served by the first network 570 and registered on both the first network 570 and the second network 580. In an aspect, the UE 104 may not actually be registered with the second network 580, but may be capable of registering with the second network 580 using the same credentials as the first network to obtain the same IP address from the second network 580. At 504, the remote end 560 may initiate the IMS call by sending an INVITE message to the IMS 178. In 505, the IMS 178 may transmit a 100 Trying message to the remote end 560. In 506 and 507, the INVITE message may be routed to the small cell 102' via the PGW 172' and the MME/SGW 162'/166'. At 508 and 509, The MME/SGW 162'/166' may page the UE 104 via the small cell 102'. In 510-520, the UE 104 may establish an RRC connection for the IMS call on the first network and notify the IMS 178 of the RRC connection. In 521, the IMS 178 may send an INVITE message to the UE 104. In 522, the UE 104 may respond by sending a 100 Trying message.

In response to sending the 100 Trying message (which may be considered an IMS setup message), in 523, the UE 104 may determine to change to the second network 580. In an aspect, for example, the UE 104 may determine an IMS call type (e.g., voice call, video telephony, emergency call, RTT call, or RCS session) based on the INVITE message. The UE 104 may then determine that the second network is preferable for the IMS call type, for example, based on programming of the UE 104 or a network provided configuration. In 524-531, the UE 104 may change the RRC connection to the second network. The steps 524-532 may be similar to the steps 510-518 for establishing the network connection. For example, in both cases, the UE 104 may establish the connection based on the monitored broadcast information. Where the first network 570 and the second network 580 use different radio access technologies, the specific messages for establishing the network connection may be different. In 533, the UE 104 may transmit a 183 Session Progress message to the IMS 178 via the second network. The change in network may be transparent to the IMS 178, which relies on the IP address of the UE 104, which has remained the same on the second network 580.

In 534-551, the UE 104 and IMS 178 may complete the setup of the IMS call over the second network 580. In 534, the 183 Session Progress message may be forwarded to the remote end 560. In an aspect, the choice to change from the first network 570 to the second network 580 between the 100 Trying message in step 522 and the 183 Session progress message in step 533 may reduce the chances of a setup failure. In particular, because the UE 104 sends both the 100 Trying message and the 183 Session progress message, the UE 104 may avoid missing any messages transmitted by the network while changing from the first network 570 to the second network 580, for example, where a single radio is used for both networks. In 535-538, the second network may establish dedicated bearers for the IMS call. In 539-541, the remote end 560 and the UE 104 may perform the provisional acknowledgement (PRACK) procedure. In 542-545, the remote end 560 and the UE 104 may update IMS resources. In 546, the UE 104 may send the 180 Ringing message, which may be forwarded to the remote end in 547. In 548, the UE 104 may send the 200 OK message in response to the 100 INVITE message. In 550 and 551, the IMS call may be acknowledged and the IMS call may begin.

Figure 6:
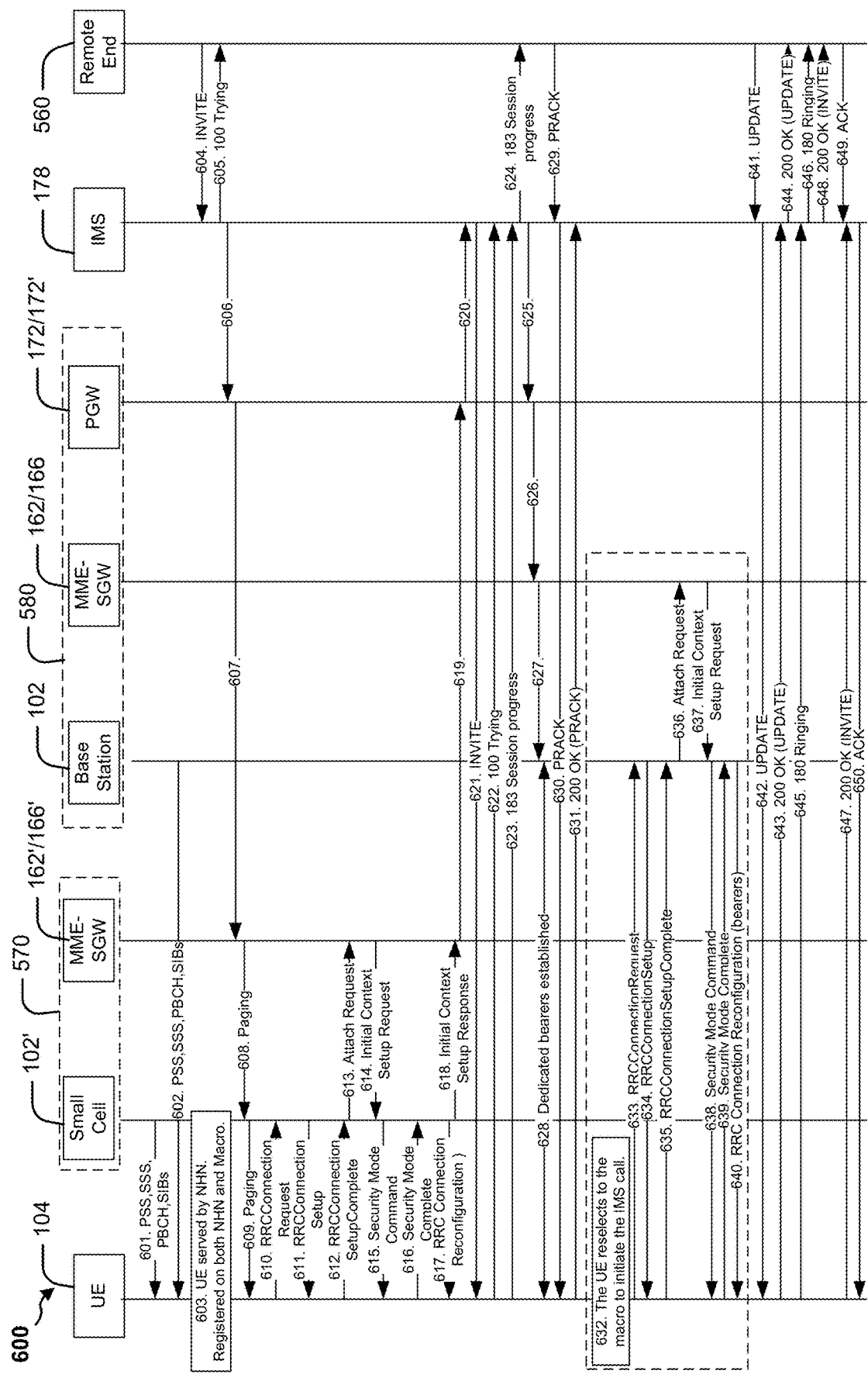
FIG. 6 is another message diagram illustrating an example call set where the UE changes from a first network to a second network.

FIG. 6 is another message diagram illustrating an example call setup where the UE changes from the first network 570 to the second network 580. The first network 570 and the second network 580 may be the same as discussed above regarding FIG. 5. Similarly, steps 601-622 may correspond to steps 501-522. In this example, the UE 104 may change networks at a different step of the IMS call setup procedure. In step 623, the UE 104 may send the 183 Session Progress message via the first network 570. In steps 624-628, the dedicated bearers for the IMS call may be established. In steps 629-630, the UE 104 and the remote end 560 may perform the PRACK procedure.

The UE 104 may change from the first network 570 to the second network 580 in response to sending the OK (PRACK) message in step 631. In 632, the UE 104 may determine to change to the second network 580 in the same manner as discussed above with respect to FIG. 5. In 633-640, the UE 104 may change the RRC connection to the second network 580. The steps, 633-640 may be similar to the steps 524-532 for establishing the network connection. The change in network may be transparent to the IMS 178, which relies on the IP address of the UE 104, which has remained the same on the second network 580.

In 641-645, the remote end 560 and the UE 104 may update IMS resources. In an aspect, in step 641 or step 642, the UPDATE message may not reach the UE 104 if the UE 104 is still changing networks when the remote end 560 sends the UPDATE message. If the UE 104 does not provide the OK (UPDATE) message 643, when the IMS 178 retransmits the UPDATE message, the retransmitted UPDATE message may be carried over the second network 580. In 645, the UE 104 may send the 180 Ringing message, which may be forwarded to the remote end in 646. In 647 and 648, the UE 104 may send the 200 OK message in response to the 100 INVITE message. In 649 and 650, the IMS call may be acknowledged and the IMS call may begin.

Figure 7A:
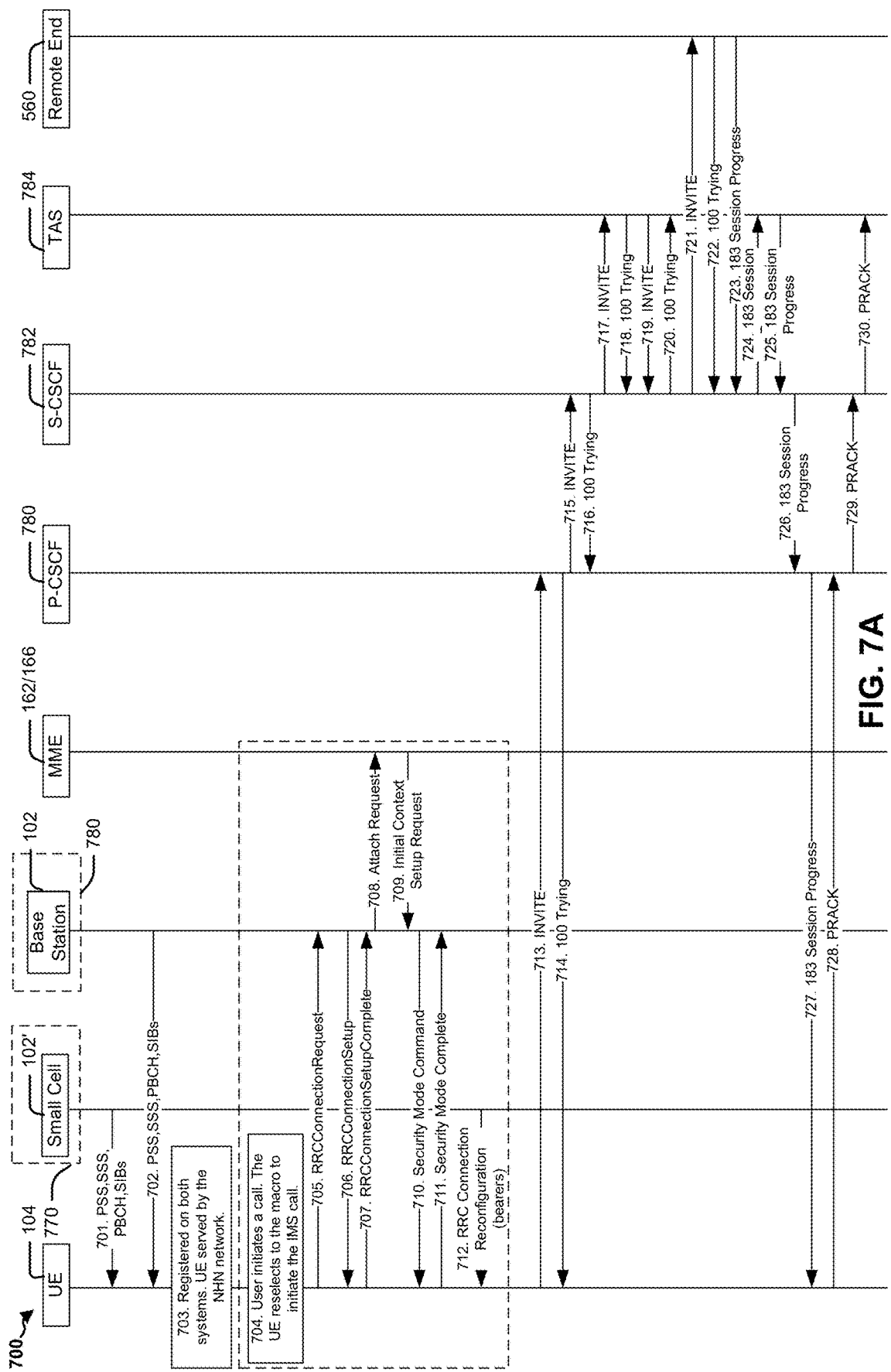
FIGS. 7A and 7B are another message diagram illustrating an example call set where the UE changes from a first network to a second network.
Figure 7B:
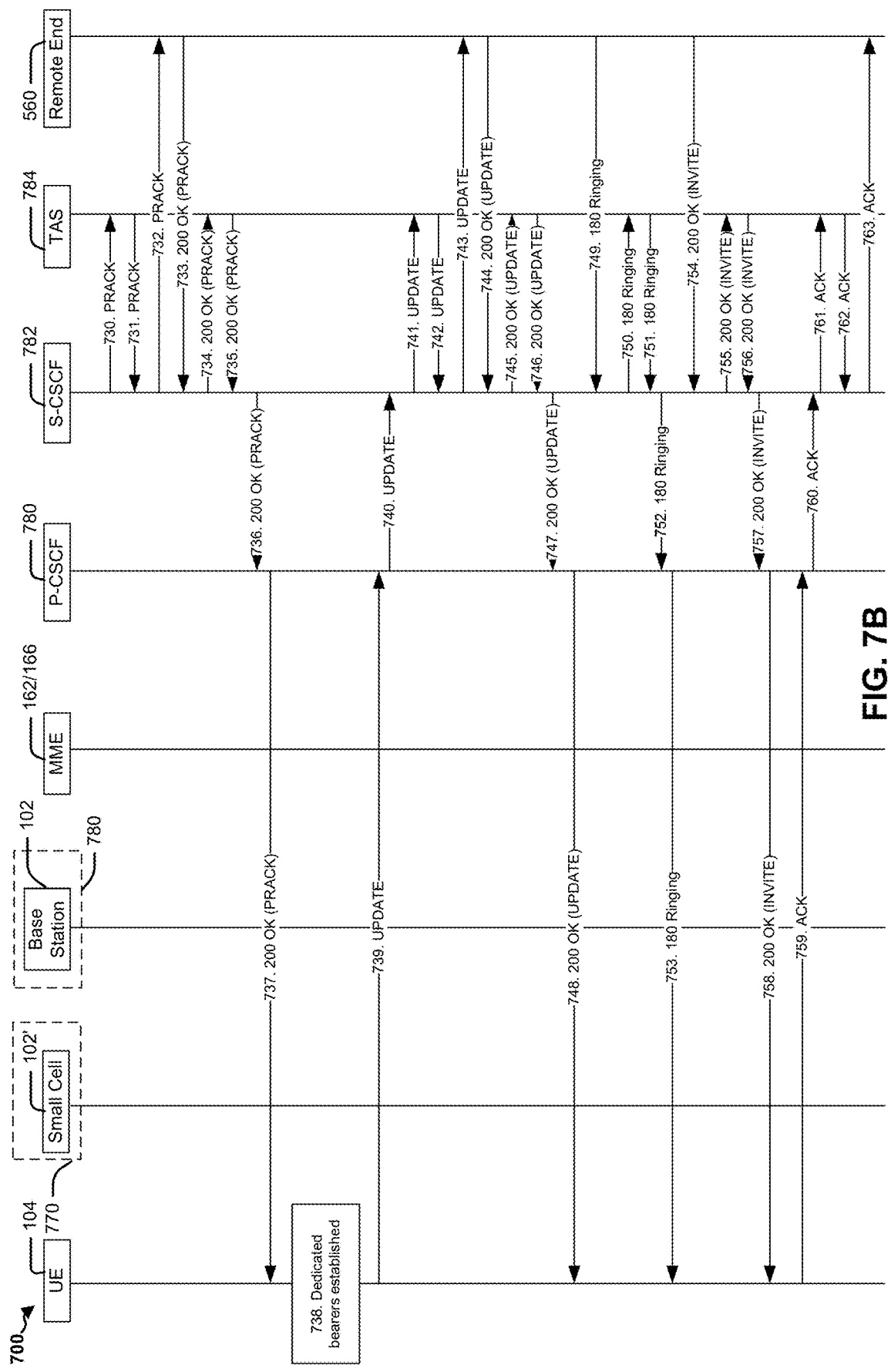

FIGS. 7A and 7B are another message diagram illustrating an example call setup where the UE changes from a first network 770, which may include the small cell 102' to a second network 780, which may include the base station 102. In this example, the UE 104 may initiate the call and the call may be considered a mobile originated (MO) call from the perspective of the UE 104. For an MO call, the UE 104 may communicate via a proxy call session control function (P-CSCF) 780, a serving call session control function (S-CSCF) 782, and a telephony application server (TAS) 784

In 701 and 702, the UE 104 may receive information broadcast by the small cell 102' and the base station 102. In 703, the UE 104 may be registered on both the first network 770 and the second network 780 and served by the first network 770, which may be the NHN. In 704, the user of the UE 104 may initiate a IMS call. The UE 104 may determine that the second network 780 is the preferred network for the particular IMS call. In 705-712, the UE 104 may change from the first network 770 to the second network 780 by establishing an RRC connection with the base station 102. Accordingly, in this example, the UE 104 may change from the first network 770 to the second network 780 before transmitting any IMS signaling messages on the first network 770. The UE 104 may then perform an IMS call setup on the second network 780.

In 713-722, the UE 104 may transmit the INVITE message, which may be forwarded to the remote end 560 via the second network 780. In 723-727, the remote end 560 may send the 183 Session Progress message to the UE 104 via the second network 780. In 728-737, the UE 104 and the remote end 560 may perform the PRACK procedure. In 739-748, the UE 104 and the remote end 560 may perform the UPDATE procedure. In 749-753, the remote end 560 may transmit the 180 Ringing message to the UE 104 via the second network 780. In 754-758, the remote end 560 may transmit the 200 OK message to the UE 104 via the second network 780. In 759-763, the UE 104 may transmit the ACK, and setup of the IMS call may be completed. The UE 104 and the remote end 560 may then communicate in the IMS call.

Figure 8:
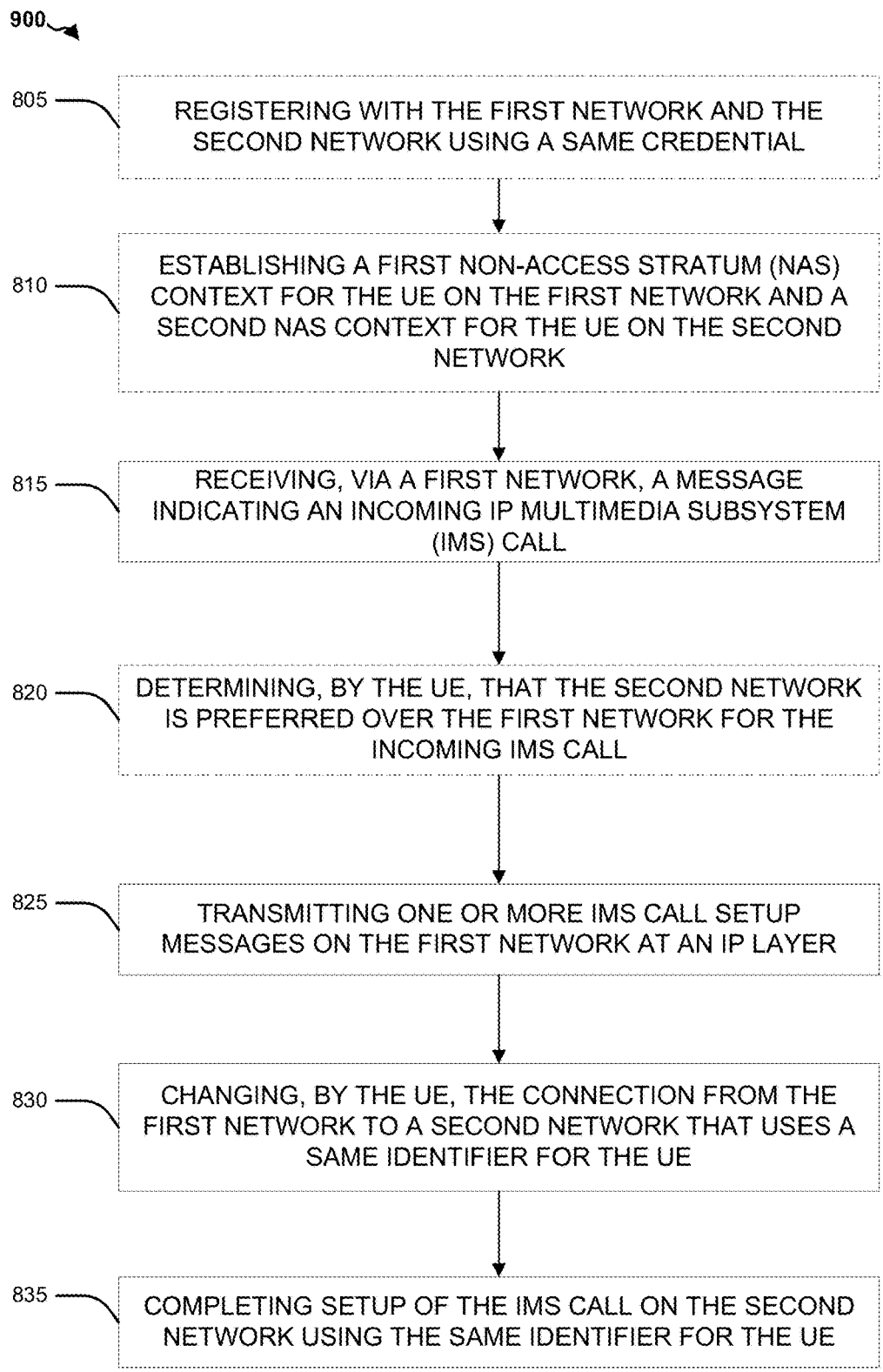
FIG. 8 is a flowchart of a method of wireless communication.

FIG. 8 is a flowchart of a method 800 of wireless communication. The method 800 may be performed by a UE (e.g., the UE 104). The UE 104 may initially have a connection to a first network that provides an IP address for the UE. The UE 104 may be served by a base station of the first network (e.g., small cell 102', AP 150, or base station 102).

In block 805, the method 800 may optionally include registering with the first network and the second network using the same credential. In an aspect, for example, the RRC component 184 may register with the first network 570 and the second network 580 using the same credential. Registering may include providing the credential to the respective network and receiving a network identifier such as an IP address. In an aspect, the first network and the second network may share a PDN gateway 172 or otherwise communicate to use the same network identifier for the UE 104 based on the credential. In an aspect, the UE 104 may use a single radio for communicating with the first network 570 and the second network 580. The UE 104 may tune away from the first network when communicating with the second network.

In block 810, the method 800 may optionally include establishing a first NAS context for the UE on the first network and a second NAS context for the UE on the second network. In an aspect, for example, the RRC component 184 may establish the first NAS context for the UE 104 on the first network 570 and the second NAS context for the UE 104 on the second network 580. The NAS context may provide a signaling path to route messages to the UE 104. A NAS context may also be referred to as an EPC mobility management (EMM) context. In an aspect, the first NAS context and the second NAS context may be established before an IMS call is initiated. By having two NAS contexts, the UE 104 may more quickly change networks because the second network does not need to establish the NAS context at the time of the change. In another aspect, the second NAS context may be established during the network change.

In block 815, the method 800 may include receiving, via the first network, a message indicating an incoming IMS call. In an aspect, for example, the IMS signaling component 182 of the UE 104 may receive, via the first network 570, the message indicating an incoming IMS call. For example, the antenna 465 may receive radio signals carrying the message, and the RF front end 488 and transceiver 402 may process the received radio signals to provide the message to the IMS signaling component 182. In an aspect, the message may be a paging message from the first network 570 indicating the incoming call. In another aspect, the message may be a SIP INVITE message including further information regarding the incoming call.

In block 820, the method 800 may optionally include determining by the UE that the second network is preferred for the incoming IMS call. In an aspect, for example, the network preference component 186 may determine, for the UE 104, that the second network 580 is preferred over the first network 570 for the incoming IMS call. The network preference component 186 may determine a type of the IMS call based on the received message indicating the incoming IMS call. The decision may be based on the type of IMS call and internally coded network preferences (e.g., based on network type) or based on parameters signaled by the UE's primary network (e.g., the network operator to which the UE 104 is subscribed). For example, the second network 580 may be preferred over the first network 570 because the second network 580 may be an operator's PLMN and may guarantee acceptable service levels for an IMS call. As another example, the second network 580 may be preferred over the first network 570 because the second network 580 have a lower cost for data.

In block 825, the method 800 may include transmitting one or more IMS call setup messages on the first network at an IP layer. In an aspect, for example, the IMS signaling component 182 may transmit one or more IMS call setup messages on the first network 570. In one aspect, the UE 104 may send at least one message to set up the IMS call on the first network 570 at the IP layer. Messages sent at the IP layer may have a destination IP address and follow an IP format. The messages may be transported over a radio connection according to the underlying protocol established by the RRC component 184. For example, the UE 104 may send a 100 Trying message indicating that the INVITE message was received. In another aspect, the UE 104 may also send the 183 Session progress message and a 200 OK (PRACK) message on the first network. The 100 Trying message, the 183 Session progress message, and the 200 OK message may each be an example of a SIP message at the IP layer. In another example, the UE 104 may complete an IMS call setup on the first network before changing networks. In one alternative aspect, the UE 104 may immediately determine to change networks without sending any IMS call setup messages on the first network.

In block 830, the method 800 may include changing, by the UE, the connection from the first network to a second network that uses a same identifier for the UE. In an aspect, for example, the RRC component 184 may change, for the UE 104, the connection from the first network 570 to the second network 580 that uses the same identifier for the UE. The identifier may be, for example, an IP address. In an aspect, the changing may be in response to reaching a particular stage of the IMS call setup. In an aspect, the IMS signaling component 182 may trigger the RRC component 184 to change networks based on the stage of the IMS call setup. For example, changing the network may be in response to sending the 100 TRYING message. The change may occur before sending a 183 Session Progress message. For example, the IMS signaling component 182 may trigger the change after sending the 100 TRYING message and then wait for the RRC component 184 to indicate that the change is complete before sending the 183 Session Progress message. In another aspect, changing the connection may be in response to sending a 200 PRACK OK message. The change may occur before the UE receives an UPDATE message. In an aspect, the change may also occur after the IMS call is set up using the first network. For example, the change may be triggered by a timer after the call is set up. In another aspect, the change may be triggered by a detected silence or period of inactivity in the IMS call.

The RRC component 184 may implement the change using several techniques. For example, the change may be controlled entirely by the UE 104. The RRC component 184 may drop or abandon the connection to the first network and establish a connection to the second network. For example, the RRC component 184 may establish a connection to the second network using an RRC procedure including RRC connection request, RRC connection setup, RRC connection setup complete, security mode command, security mode complete, and RRC connection reconfiguration messages. The RRC component 184 may drop the previous connection using a RRC connection release message. In another aspect, the RRC component 184 may change networks by triggering a network handover. For example, the RRC component 184 may transmit a measurement report indicating that conditions for a change to the second network are satisfied in response to sending the at least one message to set up the IMS call on the first network. The RRC component 184 may delay the measurement report until the correct time even if the handover conditions are previously satisfied. For example, the RRC component 184 may refrain from sending a measurement report when a current network is preferred for a current type of call. In another aspect, the RRC component 184 may change handover parameters (e.g., Qhyst, Treselection, etc.) in response to the indication of the IMS call such that the handover parameters are satisfied. After the UE 104 sends the measurement report, the first network 570 may send a handover command indicating that the UE 104 should change to the second network 580 in response to the measurement report. The UE 104 may then switch to the second network 580 in response to the handover command.

In another alternative aspect where the first network decides to change the network of the UE, the first network 570 may send an indication that the UE 104 should change networks in response to receiving the at least one message to set up the IMS call on the first network. For example, when the first network 570 receives a 100 Trying message, the first network 570 may indicate that the UE 104 should change to a second network 580 by transmitting an RRC message with a redirection indication or an indication to establish the voice/video call using dedicated resources rather than IMS.

In block 835, the method 800 may include completing setup of the IMS call on the second network using the same identifier for the UE. In an aspect, for example, the IMS signaling component 182 may complete setup of the IMS call on the second network 580 using the same identifier for the UE 104. In an aspect, the IMS signaling component 182 may use SIP signaling to complete the setup of the IMS call. The IMS signaling component 182 may transmit the SIP messages over the second network 580. For example, the IMS signaling component may transmit the 200 OK and 180 Ringing messages as illustrated in FIG. 5. From the perspective of the IMS 178, the change of networks may be transparent because the same identifier (e.g., IP address) is used for the UE 104. The UE 104 may then communicate with a remote end (e.g., another UE) in the IMS call.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE) having a connection to a first network providing an Internet Protocol (IP) address for the UE, comprising:
   receiving, via the first network, a message indicating an incoming IP Multimedia Subsystem (IMS) call;
   determining, by the UE, that a second network is preferred over the first network for the incoming IMS call based on a priority for a type of IMS call indicated by the message;
   transmitting one or more IMS call setup messages on the first network at an IP layer;
   changing, by the UE, the connection from the first network to the second network that uses a same identifier for the UE; and
   completing setup of the IMS call on the second network using the same identifier for the UE.

2. The method of claim 1, wherein the UE uses a single radio for the first network and the second network.

3. The method of claim 1, further comprising registering with the first network and the second network using a same credential, wherein the first network and the second network provide the identifier based on the same credential.

4. The method of claim 1, wherein the identifier is an IP address.

5. The method of claim 1, wherein changing the connection comprises:
   dropping, by the UE, a radio resource control (RRC) connection to the first network; and
   initiating, by the UE, a new RRC connection to the second network.

6. The method of claim 1 wherein changing the connection comprises:
   transmitting, by the UE, a measurement report indicating conditions for a change to the second network are satisfied in response to the transmitting the one or more IMS call setup messages on the first network;

receiving a handover command from the first network to handover to the second network in response to the measurement report; and switching to the second network in response to the handover command.

7. The method of claim 1, wherein the changing the connection is in response to sending a 100 TRYING message, and wherein the changing of the connection occurs before sending a 183 Session Progress message.

8. The method of claim 1, wherein the changing the connection is in response to sending a 200 PRACK OK message, and wherein the changing of the connection occurs before receiving an UPDATE message.

9. The method of claim 1, wherein the changing the connection occurs after completing setup the IMS call on the first network at a fixed time during the IMS call or when silence is detected during the IMS call.

10. The method of claim 1, further comprising establishing a first non-access stratum (NAS) context for the UE on the first network and a second NAS context for the UE on the second network before receiving the message indicating the incoming IMS call, wherein changing the connection to the second network uses the second NAS context.

11. The method of claim 1, wherein the first network is a shared network and the second network is an operator's public land mobile network.

12. The method of claim 1, wherein the first network is a shared network and the second network is a wireless local area network (WLAN).

13. The method of claim 1, wherein the first network is a wireless local area network (WLAN) and the second network is an operator's public land mobile network.

14. The method of claim 1, wherein the type of IMS call for the incoming IMS call is one of a voice call, a video telephony call, an emergency call, a real time text call, or a rich communication services session.

15. An user equipment (UE) for wireless communication, comprising:
a transceiver;
a memory; and
at least one processor coupled to the transceiver and the memory, the memory comprising instructions executable by the at least one processor to cause the UE to:
receive, via a first network, a message indicating an incoming IP Multimedia Subsystem (IMS) call, wherein the UE has a connection to the first network providing an Internet Protocol (IP) address for the UE;
determine, by the UE, that a second network is preferred over the first network for the incoming IMS call based on a priority for a type of IMS call indicated by the message;
transmit one or more IMS call setup messages on the first network at an IP layer;
change the connection from the first network to the second network that uses a same identifier for the UE; and
complete setup of the IMS call on the second network using the same identifier for the UE.

16. The UE of claim 15, wherein the transceiver includes a single radio for the first network and the second network.

17. The UE of claim 15, wherein the at least one processor is further configured to cause the UE to register with the first network and the second network using a same credential, wherein the first network and the second network provide the identifier based on the same credential.

18. The UE of claim 15, wherein the identifier is an IP address.

19. The UE of claim 15, wherein the at least one processor configured to cause the UE to change the connection is further configured to cause the UE to:
drop a radio resource control (RRC) connection to the first network; and
initiate a new RRC connection to the second network.

20. The UE of claim 15, wherein the at least one processor configured to cause the UE to change the connection is further configured to cause the UE to:
transmit a measurement report indicating conditions for a change to the second network are satisfied in response to transmitting the one or more IMS call setup messages;
receive a handover command from the first network to handover to the second network in response to the measurement report; and
switch to the second network in response to the handover command.

21. The UE of claim 15, wherein the change of the connection is in response to sending a 100 TRYING message, and wherein the change of the connection occurs before sending a 183 Session Progress message.

22. The UE of claim 15, wherein the change of the connection is in response to sending a 200 PRACK OK message, and wherein the change of the connection occurs before receiving an UPDATE message.

23. The UE of claim 15, wherein the change of the connection occurs after completing setup the IMS call on the first network at a fixed time during the IMS call or when silence is detected during the IMS call.

24. The UE of claim 15, wherein the at least one processor is further configured to cause the UE to establish a first non-access stratum (NAS) context for the UE on the first network and a second NAS context for the UE on the second network before receiving the message indicating the incoming IMS call, wherein changing the connection to the second network uses the second NAS context.

25. A user equipment (UE) for wireless communication, comprising:
means for receiving, via a first network, a message indicating an incoming IP Multimedia Subsystem (IMS) call, wherein the UE has a connection to the first network providing an Internet Protocol (IP) address for the UE;
means for determining, by the UE, that a second network is preferred over the first network for the incoming IMS call based on a priority for a type of IMS call indicated by the message;
means for transmitting one or more IMS call setup messages on the first network at an IP layer;
means for changing, by the UE, the connection from the first network to the second network that uses a same identifier for the UE; and
means for completing setup of the IMS call on the second network using the same identifier for the UE.

26. A non-transitory computer-readable medium storing code for a user equipment (UE) having a connection to a first network providing an Internet Protocol (IP) address for the UE, the code executable by at least one processor to cause the UE to:
receive, via the first network, a message indicating an incoming IP Multimedia Subsystem (IMS) call;

determine, by the UE, that a second network is preferred over the first network for the incoming IMS call based on a priority for a type of IMS call indicated by the message;
transmit one or more IMS call setup messages on the first network at an IP layer;
change, by the UE, the connection from the first network to the second network that uses a same identifier for the UE; and
complete setup of the IMS call on the second network using the same identifier for the UE.

* * * * *